Jan. 7, 1941.  J. R. MacGREGOR ET AL  2,228,032
INTERVAL RATIO INDICATOR
Filed May 10, 1937   2 Sheets-Sheet 1

INVENTORS
John R. MacGregor
Kenneth R. Eldredge
By J. U. Adams
ATTORNEY

Jan. 7, 1941.  J. R. MacGREGOR ET AL  2,228,032
INTERVAL RATIO INDICATOR
Filed May 10, 1937  2 Sheets—Sheet 2

INVENTORS
John R. Mac Gregor
Kenneth R. Eldredge
By  J. W. Adams
ATTORNEY

Patented Jan. 7, 1941

2,228,032

UNITED STATES PATENT OFFICE 2,228,032

INTERVAL RATIO INDICATOR

John R. MacGregor and Kenneth R. Eldredge, Berkeley, Calif., assignors to Standard Oil Company of California, San Francisco, Calif., a corporation of Delaware Application May 10, 1937, Serial No. 141,735

6 Claims. (Cl. 177—311)

This invention relates to a method and apparatus for measuring and indicating the ratio of intervals between cyclically repeated sets of impulses and particularly refers to a spark advance indicator for an internal combustion engine, adapted to indicate the relation between the operation of the ignition system and a given reference point or event in the operating cycle of the engine.

In the operation of rotating machinery, it is oftentimes desirable to know instantaneous values of various events in a cycle of operation, or to determine varying factors of operation such as power consumption. This latter information has been obtained in the past by means of so-called torsion dynamometers and particularly that type which measures the angle of twist or torsion produced in a shaft or similar deformable means which are designated torsion meters. The problem is to make the torque exerted upon a shaft or the angle of twist present in a rapidly revolving shaft, observable. Purely mechanical means are not satisfactory because of lost motion and centrifugal effects. Purely optical and electrical means are preferred, but are ordinarily quite complicated.

This apparatus comprehends broadly a simple electrical means for indicating the interval ratio between cyclically repeating sets of impulses. For example, if a power transmitting shaft is fitted with a pair of radial arms, one at some distance from the other, and particularly if the portion of the shaft between the arms is arranged to be responsive to torque changes so that the relative angular position of the arms will vary with changes of torque, cyclically repeated impulses set up by the first arm may be related to similar cyclically repeated impulses set up by the second arm and the interval ratio will be found to give a measure of the torque transmitted. In its simplest form this invention utilizes an impulse set up by a first element, as just described, to start a flow of electric current which is subsequently stopped by an impulse set up by a second element. If these cyclically repeated electric current impulses are measured by a meter, such as a hot-wire ammeter which measures energy, variations in the ratio of current flow to current stoppage will give an instantaneous and continuous indication of the relative angular displacement of the elements described.

A particularly desirable application of this invention is in an apparatus to indicate the relation between a given point in the cycle of an internal combustion engine, such as top dead center of a piston, and the time of ignition of the charge in that cylinder. The spark causing the ignition ordinarily precedes the top dead center position of the piston by several degrees, which is known as the spark advance of the engine. Engine designers have appreciated the importance of varying the spark advance to accommodate changes in both engine speed and load. This is accomplished in modern automobiles by incorporating in their spark advance control mechanism a means for increasing the spark advance as the engine speed increases, and a means for decreasing the advance at high engine loads. Since mechanical friction may affect the action exerted by either or both of the control mechanisms, it is apparent that the normal operation of a vehicle may be at considerable variance from its designed characteristics. Present practice in comparison testing of fuels requires the removal of the ignition system from the car and its installation on special test devices in order to ascertain the spark advance-speed-engine load characteristics, and these characteristics are commonly found to vary during the comparison tests so that accurate and consistent comparisons of detonating qualities of fuels, for example, are very difficult to obtain.

An object of this invention is to provide an apparatus which will give a continuous and instantaneous indication of the interval ratio between cyclically repeating sets of impulses, regardless of the nature of the impulses, so long as they may be utilized to start and stop the flow of an electric current.

Another object is to describe a method and apparatus for continuously indicating instantaneous values of power transmitted through a shaft.

Another object is to provide an apparatus for accurately determining the spark advance of an internal combustion engine without requiring extensive mechanical alterations to the engine structure, which apparatus is simple and inexpensive to install and is not readily damaged or affected by vibration and normal usage.

Another and very important object is to provide a spark advance indicator that may be installed on automotive vehicles to test the latter under actual operating conditions on the road, as distinguished from shop or laboratory test procedures.

These and other objects and advantages will be further apparent from the following description of a preferred embodiment of this invention, together with an alternative form of its application, and from accompanying drawings which form a part of this specification and illustrate the essential features of the invention.

Figure 1:
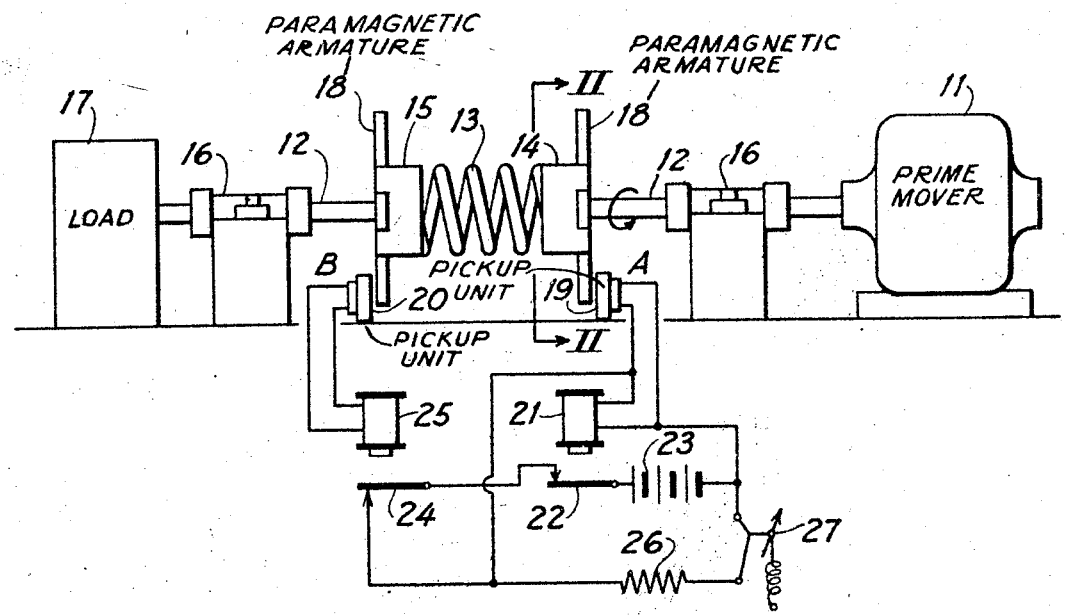
Figure 1 is a diagrammatic side elevation view of this invention as it may be applied to a torsion dynamometer or torsion meter.
Figure 2:
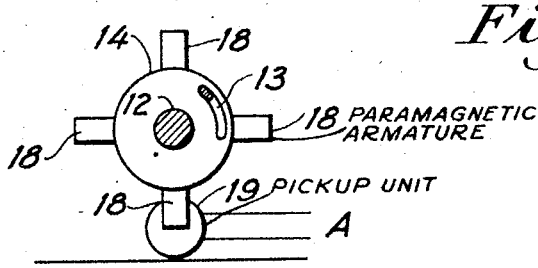
Figure 2 is a section line II—II of the dynamometer of Figure 1.

In the drawings, Figure 1 illustrates this invention as applied to a torsion meter or dynamometer. In this figure, a prime mover 11 is adapted to drive a rotatable shaft 12 in which is mounted a torsion member which, in this example, comprises a spring 13 secured between a driving flange 14 and a driven flange 15. Shaft 12 is suitably supported in bearings 16 and transmits power to a load generally designated 17.

It will be obvious that variations in load will cause spring 13 to deflect and flanges 14 and 15 to assume different angular relations, one with the other, which will be a measure of the torque transmitted by shaft 12 from prime mover 11 to load 17. In order to indicate these relative angular positions, one or more radial members or armatures 18, of paramagnetic material such as iron or steel, are secured to the faces of flanges 14 and 15. A first electromagnetic pick-up unit 19, which may be a conventional high impedance telephone receiver, is mounted adjacent flange 14 and arranged so that the radial members or armatures 18 on that flange will successively pass across the face of the pick-up member and cause a voltage change in its windings. A similar second electromagnetic pick-up element 20 is likewise mounted so that the radial members 18 on driven flange 15 will pass across its pole faces and cause a change in voltage in its winding.

Referring to the electrical circuit illustrated in Figure 1, the output impulse of pick-up element 19 is introduced into circuit A and is fed into relay 21, closing normally open contact 22 so that current may flow from battery 23 through the normally closed contact 24 of relay 25, resistor 26 and thermo-ammeter 27. As stated above, the angular position of driven flange 15 will differ from the position of driving flange 14, depending upon the torque transmitted through shaft 12, so that the corresponding radial member 18 on flange 15 will be similarly angularly displaced from the position of its corresponding element on flange 14. In the arrangement shown, the radial member 18 on flange 15 will pass pick-up element 20 after its corresponding member on flange 14 has caused the current flow just described through meter 27. The voltage impulse set up in member 20 will be transmitted into circuit B to energize relay 25 and cause the latter to open contact 24. This de-energizes relay 21 by interrupting the current flow from battery 23 and causes contact 22 to open. It also stops the current flow through meter 27. When the next succeeding member 18 on flange 14 energizes pick-up element 19, the same cycle is repeated. Where the speed of rotation of shaft 12 is constant or varies according to known conditions, meter 27 may be any current responsive instrument, but where changing or unknown speeds are encountered, a meter which is responsive to average current, is required, as will be explained below. Where speed is constant the wave form of the output current of the pick-up element 19 flowing each cycle will be uniform in shape and will give reproducible deflections with any specific type of current flow meter, regardless of the nature of the latter's response to wave form. If, however, the speed is variable the shape of the wave form will also be variable and may cause the same average current value to give a different deflection of the same meter.

The ratio of time that the current is flowing through meter 27 to the time that no current flows in the meter circuit will cause this meter to indicate some value of current which is greater than zero and yet not equal to the maximum value. The greater the time interval between the energizing of relay 21 and the energizing of relay 25 compared with the following interval during which no current flows, the greater will be the reading on meter 27. The circuit of Figure 1 is satisfactory for slow speed operation, but for high speeds mechanical relays are ordinarily unsatisfactory. For such speeds electronic devices, such as will be described below, are usually required and will be found to be also adapted for low speed operation.

Figure 3:
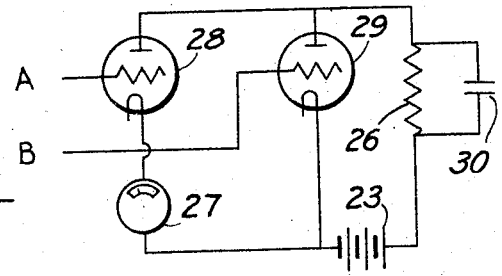
Figure 3 is a schematic diagram of an electrical circuit which may be used in place of that shown in Figure 1.

A schematic diagram illustrating an electrical circuit which may be substituted for that of Figure 1 and which is particularly adapted for high speed operation is shown in Figure 3. In this arrangement, the voltage impulse from pick-up element 19 is passed through circuit A to the grid of electron tube 28 which may be a "grid-glow" or "thyratron" tube. This type of tube has the property of passing any current within its capacity with a constant voltage drop of about 15–20 volts. Once the plate current has started to flow through a tube of this type, minor changes in grid voltage have no further effect. Consequently, the voltage impulse applied to tube 28 causes the tube to conduct, thereby permitting current to flow from battery 23 through resistor 26 and meter 27. When a voltage impulse from pick-up element 20 is impressed through circuit B onto the grid of the electron tube 29, that tube becomes conducting, causing the potential drop across tube 28 to fall to a value less than its ionization potential so that it no longer remains conducting. Once ionization has ceased, the plate voltage may be restored across tube 28 but that tube will remain non-conducting until its grid is again charged positively above the critical value.

In an electronic circuit such as has just been described, and particularly where the frequency of the impulses into circuits A and B may be variable and it is desired to use a type of meter which is only approximately responsive to average current, it is desirable to compensate the circuit as by introducing a capacitor 30 shunted across resistor 26. Capacitor 30 gives an extra impulse of current to the meter 27 each time that the circuit is energized by its well-known ability to store a quantity of electric charge. The amount of extra electric charge per cycle is determined by the capacitance of capacitor 30 and by the voltage drop across resistor 26. Because of the torque characteristics of an ordinary moving coil meter, the indication of such a meter is dependent upon the wave form of the current through the meter. If the ratio of time of current on to time of current off is kept constant, but the number of impulses per second, or the frequency, is increased, the integrated current in the circuit will remain a constant but the indication of a moving coil meter will decrease. The extra quantity of electric charge introduced by capacitor 30 will tend to increase the indication of the moving coil meter as the frequency increases and so compensate for the adverse effects of frequency change. Practically, this capacitor 30 may be adjusted to compensate so that the indication of the meter will be within one degree of spark advance over normal ranges of engine speed.

Figure 4:
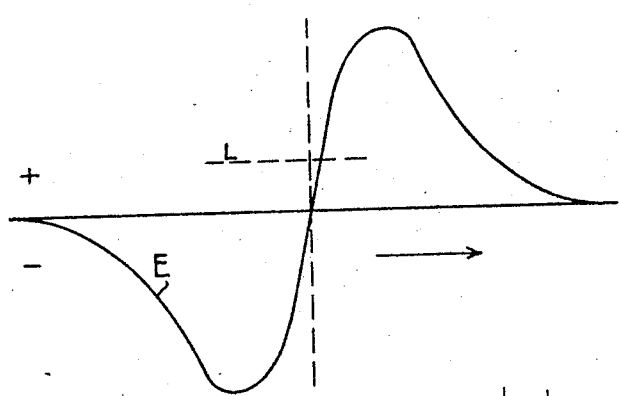
Figure 4 illustrates diagrammatically the wave form of an electromagnetic pick-up unit adapted to be used with this invention.

As stated above, a positive polarity impulse is required to cause electron tubes 28 and 29 to be actuated by circuits A and B respectively. This may be provided by suitable arrangement of the poles of pick-up elements 19 and 20 or by suitable pole changing switches in circuits A and B. Figure 4 illustrates substantially one desired wave form of the voltage generated by the pick-up units 19 and 20. When the voltage curve E crosses the zero axis the rate of change of flux is zero and corresponds to the point of magnetic symmetry of the radial member or armature 18 and the magnetic axis of the telephone receiver pick-up element 19 or 20. A further movement of member 18 causes a rapid increase of voltage in the positive direction, as illustrated by the right side of the curve E of Figure 4. Suitable reversing switches should preferably be placed in circuits A and B so that the first part of the impulse will be negative and the second part positive, as shown in Figure 4. Thus, the rate of voltage increase will be so rapid, regardless of the speed of the armature 18, that substantially no time lag will occur between the point of coincidence of the magnetic axes of the pick-up units 19 and 20 and the actuating members 18.

Figure 5:
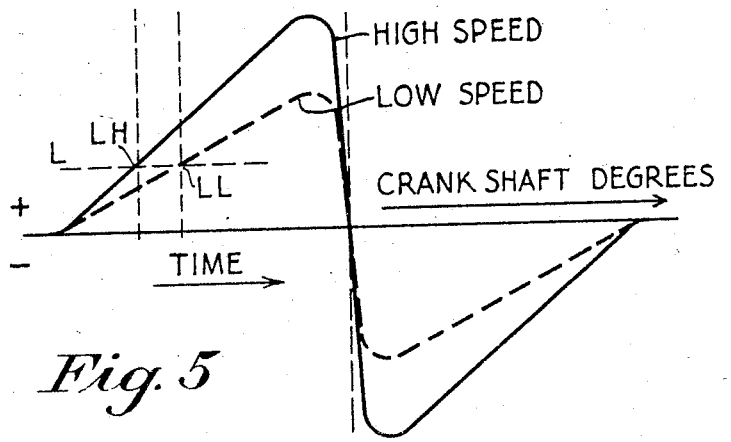
Figure 5 illustrates diagrammatically the wave form of an electromagnetic pick-up unit adapted to compensate the circuit for frequency or speed changes.

Another means for compensating a circuit in which a moving coil type of current indicating instrument is desired is the utilization of a variable time element, dependent upon speed and involving the rate of increase of the voltage output of the magnetic pick-up unit 19 which starts the current flow in the circuit. The voltage generated in the magnetic pick-up unit 19 is a function of the rate of change in magnetic flux which is in turn proportional to the speed of the means causing the successive impulses. By choice of the proper pole piece shape and arrangement, wave forms such as are shown in Figure 5 may be obtained. If the tripping or starting voltage of the circuit is represented by line L, then for low speed operation the contactor means will be actuated at point LL. Higher speed operation will cause a more rapid building up of the voltage so that the contactor means will be actuated at LH. With such an arrangement, the higher the frequency of the successive impulses the greater will be the proportion of the time which current will flow through the meter 27. This increase of time can readily be made to balance or compensate for the inherent decrease of indication of a moving coil instrument with increasing frequency so that over ordinary speed ranges satisfactory compensation will be obtained.

Figure 7:
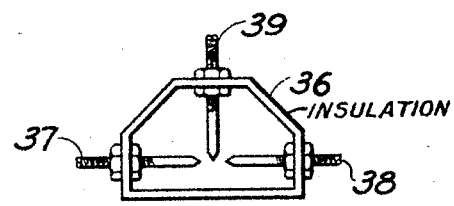
Figure 7 is a detail view of one form of isolation gap which is desirable for the ignition system pick-up of a multi-cylinder engine.
Figure 6:
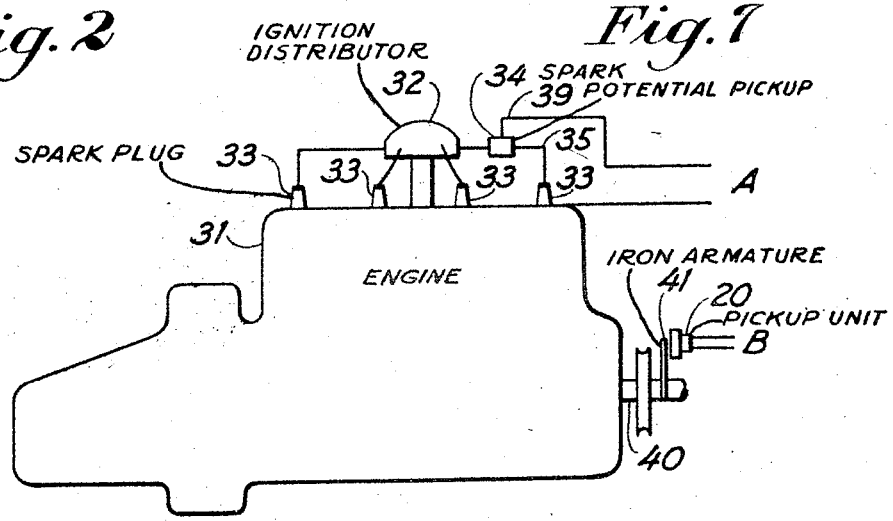
Figure 6 is a diagrammatic side elevation view of a conventional internal combustion engine illustrating a first pick-up unit actuated by the ignition system, and a second pick-up unit actuated by a rotating part of the engine.

Figure 6 illustrates diagrammatically the application of this invention to an internal combustion engine for the purpose of indicating the degree of spark advance. In that figure the engine is generally represented by reference numeral 31, and is provided with the usual high tension distributor 32 for spark plugs 33. In the case of a single cylinder engine, circuit A may be connected through a suitable high resistance to the high potential side of the ignition system. In the case of multi-cylinder engines such as shown in Figure 6, stray voltages may be encountered which would interfere with the isolation of the desired ignition impulse. A suitable isolation gap illustrated in Figure 7 and generally designated 34, is preferably inserted in the lead 35 to one of the spark plugs 33. This gap is shown in Figure 7 and consists of an insulating frame 36 with three electrodes, 37, 38 and 39. Electrodes 37 and 38 are connected in series in lead 35, and electrode 39 leads to one side of circuit A and to the current starting tube 28 (Figure 3). The third electrode 39 is so arranged that potential is applied to it only while the spark is actually jumping to the specific spark plug to which isolation gap 34 is connected. Lesser voltages are unable to jump the air gap and phantom impulses are thereby eliminated.

The electromagnetic pick-up element 20, which delivers the stopping impulse to circuit B and tube 29, may be a watch-case telephone receiver of the high impedance type, suitably mounted adjacent an exposed rotating part of the engine, such as the exposed forward end of the engine crankshaft 40. The projection on the crankshaft may consist of a bolt head on the fan pulley or any paramagnetic element which, in rotating, will reduce the air gap of pick-up unit 20 or otherwise modify its voltage output once each revolution. With an iron armature 41 of approximately four inch radius sweeping by the pole faces of the pick-up unit 20 at a distance of about one-sixteenth of an inch, peak voltages of the order of 20 volts will be obtained at engine speeds of about 2,000 revolutions per minute. The armature 41 and the pole pieces of telephone receiver 20 should be arranged so that a voltage impulse as shown in Figure 4 is obtained at a predetermined position of the piston or crank throw corresponding to the cylinder to which the isolation gap 34 is connected. The time of operation of the circuit B will then occur within a fraction of a degree of crankshaft rotation from this point.

Figure 8:
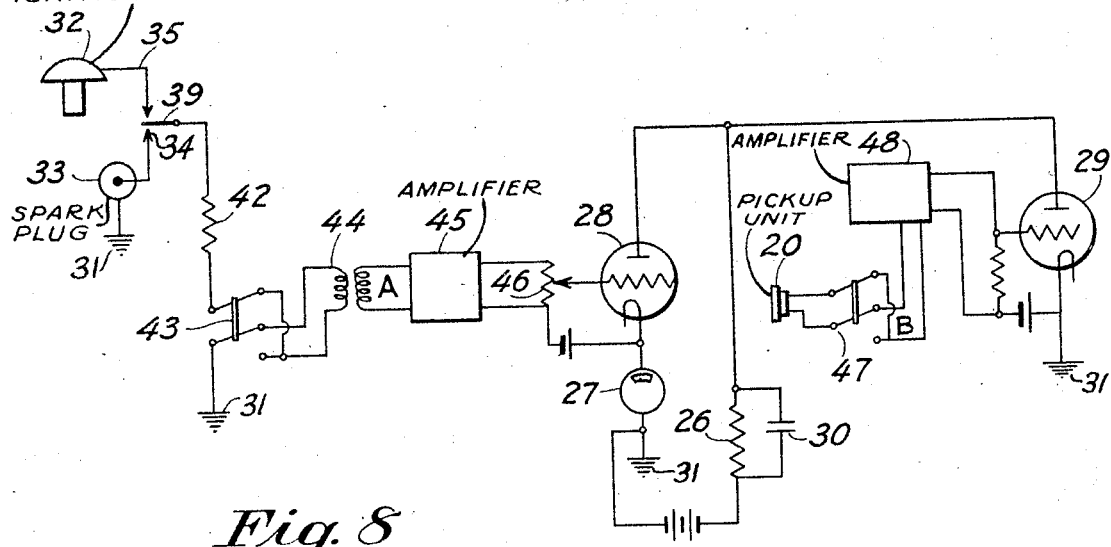
Figure 8 is a complete wiring diagram of a spark advance indicator using electron tubes to control the current impulses to the indicating meter.

With means now available for obtaining two impulses, one caused by the passage of the ignition spark and the other by the output from a pick-up unit in predetermined phase relation to the crankshaft, the problem becomes one of measuring the ratio of the interval between the first impulse in circuit A and the first impulse in circuit B to the interval between the first impulse in circuit B and the second impulse in circuit A. Figure 3, as stated above, illustrates diagrammatically an electron tube arrangement for such measurements. Figure 8 illustrates in detail the wiring diagram of an actual operating circuit for indicating the interval ratios. Obviously, this circuit could also be applied to the mechanical apparatus of Figure 1 in place of the magnetic relays there shown, or could equally well be applied to any situation where indication of the interval ratio between cyclically repeating sets of impulses is desired, for example in the synchronization of two similar engines or other equipment where relative positions of a given point or event in their respective operations would serve to give an indication of their relative speed. Also, the functions of the ignition system potential responsive means and the pick-up element 20 in starting and stopping the current flow to meter 27 could obviously be interchanged without departing from the basic features of the invention outlined above.

Referring now to Figure 8, circuit A is illustrated as leading from isolation gap 34 in spark plug lead 35 through a resistor 42 to a pole changing switch 43, and thence through the primary of a coupling transformer 44 to ground on the frame of engine 31. Resistor 42 may be of about 10 megohms and will be found to have no appreciable effect upon the ignition system of the engine. The output of coupling transformer 44 may be considered to be the equivalent of the A circuit previously mentioned and is passed through a preamplifier generally designated 45. This arrangement is desirable for two reasons: first, if for any reason the starting impulse should be weak, then the preamplifier will build it up to a usable voltage; second, the current starting tube 28 used may not be absolutely independent of grid voltage. If current is flowing through tube 28, large changes of grid voltage may adversely affect the plate current. The preamplifier 45 together with the potentiometer 46 on the input to tube 28, enables one to choose a voltage which will satisfactorily actuate the tube to conduct current to meter 27, and yet not be so great as to adversely affect its operation. In practice, potentiometer 46 is adjusted by increasing its output until tube 28 functions. Further increases in voltage output will not affect the reading of meter 27 until such a point is reached that the grid voltage is too high and the meter becomes unsteady. Operation of the indicator at any place in the zone of steady reading is satisfactory and the meter indication remains constant for a given spark advance.

The voltage output of electromagnetic pick-up element 20 (Figure 6) to the B circuit is introduced into pole changing switch 47 so that its polarity (Figure 4) may be properly adjusted and is introduced into a second preamplifier 48, the output of which is impressed upon the stopping tube 29. The preamplifier 48 on stopping tube 29 performs the same function as the preamplifier 45 for starting tube 28. A gain or amplification control is generally not necessary at this point, maximum amplification ordinarily being used, for, after the stopping tube 29 has once performed its function of terminating current flow through meter 27, any further change in circuit conditions will have no effect on the meter reading. Maximum gain is also desirable in that it enables the stopping tube 29 to function on the lowest possible positive voltage output from the magnetic-pick-up unit 20.

The circuit just described and illustrated in Figure 8 utilizes a compensating capacitor 30 so that a thermo-ammeter is not required for instrument 27. If a thermo-ammeter is used, or if constant or known speeds are encountered, capacitor 30 and resistor 26 may obviously be omitted.

In conclusion, it will be appreciated that this invention will accurately and continuously give an instantaneous indication of the interval ratio between cyclically repeating sets of impulses to indicate relative displacements of elements on the same machine or on different pieces of moving equipment. Although specific embodiments and applications of this invention are described and illustrated, it is understood that many changes and modifications could be made without departing from the invention and all such modifications as are within the scope of the following claims are embraced thereby.

We claim:

1. A spark advance indicator for a spark ignition internal combustion engine comprising an electric current averaging meter, a source of electric current for said meter, means adapted to be connected to the ignition system of said engine and responsive to a spark-producing potential in said system for connecting said meter to said current source, a stationary magnetic pick-up coil adapted to be spaced from a rotating part of said engine to induce a potential in said coil at a predetermined position of said rotating part, and means responsive to the induced potential in said pick-up coil for disconnecting said meter from said current source.

2. A spark advance indicator according to claim 1 in which said meter connecting and disconnecting means comprise electron tubes.

3. A spark advance indicator for a spark ignition internal combustion engine, comprising a magnetic pick-up coil adapted to be spaced from a cyclically moving part of said engine and to have induced therein an electric potential by the motion of said moving part, an electric current averaging meter, a source of electric current therefor, and means adapted periodically to connect said meter to said current source and to disconnect it therefrom during a predetermined cycle of operation of said engine, said means comprising two electric current controllers, one adapted to be connected to the ignition system of said engine to be actuated by a spark-producing potential therein, and the other adapted to be connected to said magnetic pick-up coil to be actuated by an induced potential therein.

4. A spark advance indicator for a spark ignition internal combustion engine, comprising a magnetic pick-up coil adapted to be spaced from a cyclically moving part of said engine and to have induced therein an electric potential by the motion of said moving part, an electric current averaging meter, a source of electric current therefor, and means adapted periodically to connect said meter to said current source and to disconnect it therefrom during a predetermined cycle of operation of said engine, said means comprising two three-element electron tubes, the grid of one to be adapted to be connected to the ignition system of said engine and to be energized by a spark-producing potential therein, and the grid of the other tube adapted to be connected to said magnetic pick-up coil to be energized by an induced potential therein.

5. A spark advance indicator according to claim 4 with the addition of amplifying means for the grids of said electron tubes.

6. A spark advance indicator for a spark ignition internal combustion engine, comprising means responsive to a cyclically moving part of said engine to produce an electric current impulse at a predetermined point in the travel of said moving part, a direct current averaging meter, a source of direct current for said meter, and means adapted periodically to connect said meter to said current source and to disconnect it therefrom during a predetermined cycle of operation of said engine, said means comprising two electric current controllers, one adapted to be connected to the ignition system of said engine to be actuated by a spark-producing potential therein, and the other adapted to be connected to said first-named electric current impulse-producing means to be actuated by a current impulse therefrom.

JOHN R. MacGREGOR.
KENNETH R. ELDREDGE.